Feb. 25, 1941.                F. E. FENDER                2,232,940
                               POTATO PEELER
                            Filed Feb. 23, 1940
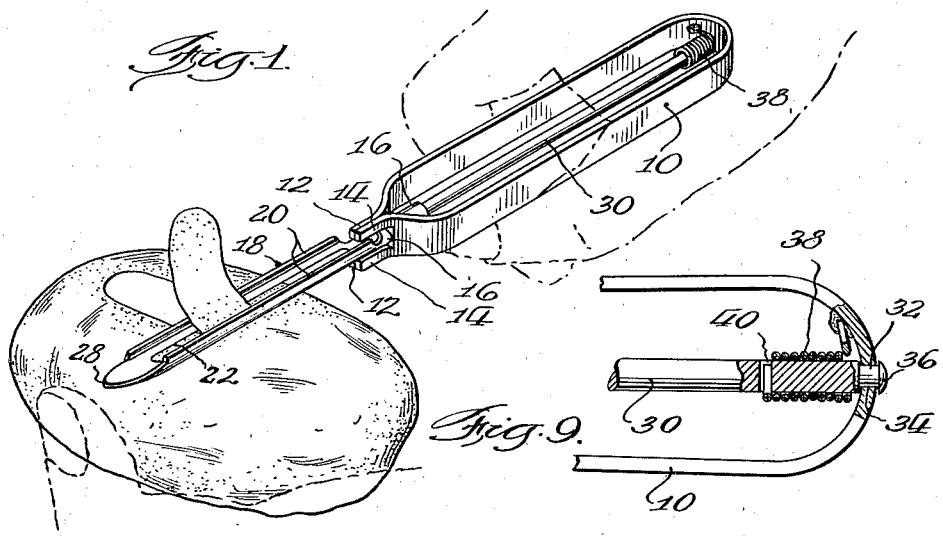
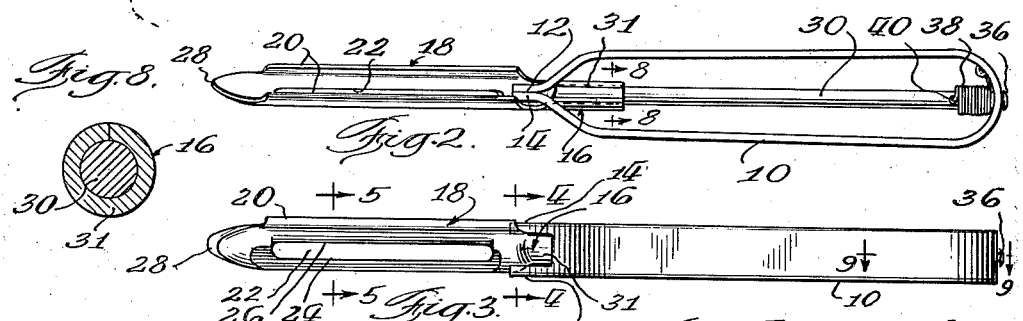
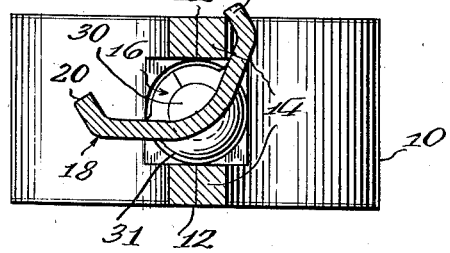
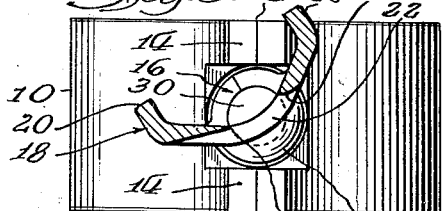
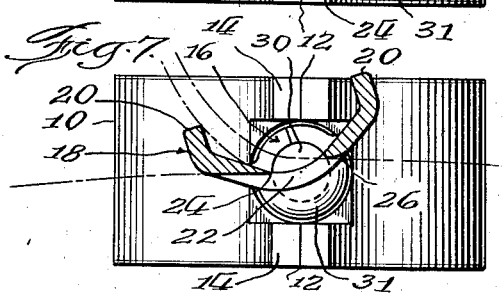
Inventor
Ferdinand E. Fender
BY Williams, Bradbury,
McCaleb & Hinkle, Attys Patented Feb. 25, 1941

2,232,940

UNITED STATES PATENT OFFICE 2,232,940

POTATO PEELER

Ferdinand E. Fender, Evanston, Ill., assignor to Vaughan Novelty Mfg. Co., Chicago, Ill., a corporation of Illinois Application February 23, 1940, Serial No. 320,271

4 Claims. (Cl. 30—278)

This invention relates to a device for paring potatoes, apples and similar vegetables and fruits.

It is an important object of this invention to provide a novel potato peeler having a pivoted blade adapted to follow the uneven surface of the fruit or vegetable during the peeling stroke, and in which the blade is always automatically presented to the surface of the fruit or vegetable in a position that will assure ready engagement of the blade.

Another object is to provide a novel potato peeler having means to prevent the blade's skidding over or catching in the fruit or vegetable at the commencement of a paring stroke.

Other objects and advantages will become apparent from the following description and the attached drawing, in which:

Fig. 1 is a perspective view showing a potato peeler embodying the present invention in use;

Fig. 2 is a plan view of the device shown in Fig. 1;

Fig. 3 is a front elevation of the potato peeler shown in Figs. 1 and 2;

Fig. 4 is an enlarged sectional view taken in the direction of the arrows along the line 4—4 of Fig. 3, showing the relative positions of the handle and blade before the beginning of a paring stroke;

Fig. 5 is a sectional view similar to Fig. 4, but taken in the direction of the arrows along the lien 5—5 of Fig. 3;

Fig. 6 is a sectional view similar to Fig. 4, but showing the manner in which the blade moves when brought into contact with a potato or other vegetable or fruit to be peeled;

Fig. 7 is a sectional view similar to Fig. 5, but showing the position assumed by the blade during a peeling operation;

Fig. 8 is a sectional view taken in the direction of the arrows along the line 8—8 of Fig. 2, illustrating the attachment of the blade to the rotatable rod; and Fig. 9 is an enlarged sectional view taken in the direction of the arrows along the line 9—9 of Fig. 3.

Referring to the drawing, in which similar numerals refer to similar parts throughout the several views, the potato peeler comprises generally a handle 10, which is intended to be held in the hand of the operator and to which the other elements of the peeler are attached. This handle is formed from a length of strip steel bent as shown to form an elongated oval with the free ends pressed flat together at 12 and welded to each other. The projecting portion formed by the welded ends is slotted transversely to provide two fingers 14 spaced apart a distance sufficient to permit the insertion therebetween of the root portion 16 of a cutting blade 18, as will be more fully described shortly.

The cutting blade is formed from a flat strip of high carbon, or other cutlery steel, which is bent longitudinally to a generally U-shaped form having upstanding edge ribs 20. The ribs 20 serve to stiffen the blade to prevent flexing, while the external central portion of the U is ground away at an obtuse angle from each side to provide a slot 22 through the central portion of the blade. This grinding, as best seen in Figs. 3, 5 and 7, is so conducted that a sharp cutting edge 24 is formed at the left side of the slot 22, as viewed from the outward or free end of the blade, while the metal at the other side of the slot is rounded away somewhat to provide a surface 26 adapted freely to slide over the surface of a potato or the like during a peeling stroke.

The outward or free end of the blade 18 is sharpened at 28 to enable this end of the blade to be used for gouging out eyes or bad spots in potatoes. The root 16 of the blade 18 is rolled around one end of a round shaft 30, as best seen in Fig. 8, to form a cylindrical cuff 31, and is welded or otherwise securely affixed thereto, so that, in effect, the blade 18 becomes an extension of the shaft 30.

The shaft 30 extends axially through the handle 10 and has at its opposite end a portion 32 of reduced diameter, which is passed through a hole 34 in the handle 10 and is peened over at 36 to prevent the shaft from being withdrawn. When the shaft is assembled to the handle, as above described, the cylindrical cuff 31 of the blade 18 extends through a hole at the forward end of the handle, and forms a bearing, which, together with the portion 32, serves to journal the shaft and blade for rotation about a longitudinal axis relative to the handle. Because the fingers 14 overlie the root 16 of the blade and serve as stops, it will be appreciated that the relative rotation between the blade and handle is limited to a matter of about ninety degrees. In Figs. 4 and 5 the blade is shown rotated to one of its extreme positions.

A coil spring 38 surrounds the rearward portion of the shaft 30 and has one of its ends anchored to the handle, while the other extends through a small hole 40 in the shaft. This spring serves resiliently to rotate the shaft and attached blade against one of the stops, so that when the handle is held as shown in Fig. 1, the side of the blade nearer the operator is elevated.

In use, the handle is grasped in the right hand of the operator, as illustrated in Fig. 1. In this position, the blade is resiliently held against the upper stop, as shown in Figs. 2, 3, 4 and 5. As the blade is brought into contact with the potato, the lower or left edge of the blade strikes the potato first and as shown in Fig. 6, the blade is rotated into cutting position. As the blade is drawn toward the user, the sharp edge 24 will cut into the potato, as shown in Figs. 1 and 7, the slice of potato peeling curling upwardly through the slot 22. At the end of the peeling stroke, the blade will be rotated against the stop by the spring 38, and thus prepared for the next stroke.

With the device shown, it will be seen that the blade is always in position for a paring stroke, and yet is free to move to whatever position is necessary to follow the contour of the potato or other vegetable or fruit being peeled.

Having described my invention, what I claim as new and useful and desire to secure by Letters Patent of the United States is:

1. In a potato peeler, a handle, a cutting blade journaled to rotate in said handle, said blade having a sharp cutting edge and a guard surface to determine the depth of cut and a slot between said edge and said surface through which peelings removed by said edge may pass, stop members coacting with said blade to limit the degree of rotation of said blade relative to said handle, and resilient means to rotate said blade against said stop means.

2. A potato peeler comprising, a handle, a blade journaled to rotate relative to said handle on an axis extending longitudinally of said blade, said blade having a sharp cutting edge and a guard member to determine the depth of cut and a slot between said edge and said member through which peelings removed by said edge may pass, stop means on said handle cooperating with said blade to limit the degree of rotation of said blade relative to said handle, and a spring coacting between said blade and said handle resiliently to hold said blade against said stop.

3. In a device of the class described, a body portion comprising a length of strip metal bent to form an elongated oval with the ends thereof joined together in face-to-face engagement, a shaft extending longitudinally through said body portion, a cutting blade secured at one end to said shaft, and extending outwardly from said body portion, said blade having a sharp cutting edge and a guard member to determine the depth of cut and a slot between said edge and said member through which peelings removed by said edge may pass, said shaft and said blade adapted as a unit to rotate relative to said body portion, a stop to limit the amount of rotation of said blade relative to said body portion, and a spring coacting between said body portion and said blade to bias said blade in one direction.

4. In a device of the class described, a body portion comprising a length of strip metal bent to form a handle, a shaft extending longitudinally through said body portion, a cutting blade secured at one end to said shaft and projecting outwardly beyond said body portion, said blade having a sharp cutting edge and a guard member to determine the depth of cut and a slot between said edge and said member through which peelings removed by said edge may pass, said shaft and blade adapted as a unit to rotate relative to said body portion, and a stop to limit the degree of rotation of said blade relative to said body portion.

FERDINAND E. FENDER.